United States Patent [19]

Okubo et al.

[11] 3,935,292

[45] Jan. 27, 1976

[54] CAST POLYMERIZATION PROCESS WITH IMPROVED MOLD RELEASE

[75] Inventors: Hiroshi Okubo; Masamichi Kato; Isao Kaetsu; Akihiko Ito, all of Takasaki, Japan

[73] Assignee: Japan Atomic Energy Research Institute, Tokyo, Japan

[22] Filed: Mar. 20, 1974

[21] Appl. No.: 453,044

[30] Foreign Application Priority Data
Mar. 23, 1973   Japan.................... 48-32605

[52] U.S. Cl. ............... 264/338; 106/38.22; 264/1; 264/331; 264/341
[51] Int. Cl.² ................................... B29C 1/04
[58] Field of Search ...... 264/338, 337, 1, 236, 341, 264/331, 347; 106/38.22

[56] References Cited
UNITED STATES PATENTS

| | | | |
|---|---|---|---|
| 2,426,402 | 8/1947 | Magrane et al................... | 264/331 |
| 2,593,827 | 4/1952 | Anspon et al..................... | 264/331 |
| 2,817,878 | 12/1957 | Anspon............................. | 264/338 |
| 3,492,394 | 1/1970 | Heine................................ | 264/338 |
| 3,755,262 | 8/1973 | Slagel............................... | 264/338 |

*Primary Examiner*—Jeffery R. Thurlow
*Attorney, Agent, or Firm*—Browdy and Neimark

[57] ABSTRACT

A process for producing cast polymer is carried out by using a mold treated by the following steps: coating the glass surface of the mold with polysiloxane; heating the coated glass surface at a temperature in the range of from more than about 150° C. to a temperature at which the coated polysiloxane is not hardened yet; and wiping the coated surface of baked polysiloxane. Not only is easy mold release attained, but also repeated use of the same mold becomes possible.

6 Claims, No Drawings

CAST POLYMERIZATION PROCESS WITH IMPROVED MOLD RELEASE

FIELD OF THE INVENTION

This invention relates to a process for producing cast polymer by using a specific mold.

BACKGROUND OF THE INVENTION

One of the known processes for producing cast articles in the form of sheets, plates, lenses and the like, having poor thermoplasticity, is generally called "cast polymerization." This cast polymerization process comprises the steps of charging a monomer and/or prepolymer to be cast into a mold, polymerizing the monomer and/or prepolymer by a suitable polymerization means and releasing the resulting cast polymer article from the mold.

As material for the mold, glass combines convenience in use, economy and proper workability for the production of cast polymer articles in the form of a plate, a sheet, a lens and the like.

However, when used in a cast polymerization process a mold made of glass has various disadvantages. One that is when the cast article of synthetic resin strongly adheres to the glass, release of the cast article from the mold becomes difficult. It is important to be able to easily release the cast article from the mold, because, if mold release is difficult, it becomes a bar to the practical application of such process. That is, much time will be required for the removal of the cast product from the mold, thereby decreasing efficiency in production. And more, in releasing cast articles which adhere strongly to the mold, they are often damaged, especially on the surface. This is a fatal defect from a commercial viewpoint.

So-called "lubricants" or "release agents" are generally used to make it easier to release the cast articles from the surface of the mold-cavity. A large number of various types of silicone-series lubricants have been developed and used. One of the most popular lubricants is polysiloxane (or silicone oil). In the prior art processes, however, polysiloxane or silicone oil was simply coated on the surface of a mold-cavity, or alternatively, the coated polysiloxane was baked at a temperature as high as at least 350°C to result in hardening. In case a synthetic resin material having strong adhesion to glass is used for cast polymerization, the mold on which polysiloxane or silicone oil is just coated without heating can be used only once. The reason is that when the mold is used in casting, the lubricant results in being removed from the mold surface.

Alternatively, when dimethyl polysiloxane is coated on the mold, followed by heating the coated mold at a temperature of 350° C. or higher to harden the coating, the resulting polysiloxane film on the mold is damaged. As a result, when cast polymerization is carried out by using the mold having such polysiloxane film thereon, the cast polymer removed from the mold often has an unattractive surface, such as stripes, pock marks, unevenness, cloudiness and the like. Thus the above prior art processes are unsatisfactory in order to obtain a finished product having an optically smooth surface.

Another serious disadvantage of these prior art processes is that repeated use of the same mold is impossible.

Most synthetic resin materials adhere very strongly to glass, and there have been, up to now, no useful processes which can provide acceptable mold release properties. Namely, there have been, up to now, no practical processes for cast polymerization by which cast polymer articles which adhere strongly to glass can be produced efficiently, using a mold made of glass, at least for the mold-cavity.

SUMMARY OF THE INVENTION

Accordingly, one object of the present invention is to provide an improved cast polymerization process free from the above defects; that is, the present invention provides a mold made of glass the surface of which has been specifically treated so that release of the cast article from the mold is easy, and efficient production of cast articles of synthetic resins which adhere strongly to glass is achieved.

Another object of the present invention is to provide a process using a mold made of glass for the production of the cast polymer articles which adhere strongly to glass, in which repeated use of the same mold is possible and therefore the process can be carried out economically.

A further object of the present invention is to provide a process for the production of cast polymer articles which do not adhere to glass as strongly as the polymers mentioned above, which can be carried out with remarkable efficiency as a result of the improvement in mold release.

The above and the other objects of the present invention will become clear from the following description and the claims as described hereinbelow.

According to the present invention, polysiloxane or silicone oil is coated on one surface of each of the glass mold walls, and then the coated glass walls are heat treated at a temperature in the range of from more than about 150° C. to a temperature at which polysiloxane is not yet hardened, followed by wiping the baked surface with a dry or organic solvent-dampened cloth, gauze or the like. Synthetic resin to be cast which strongly adheres to glass is charged in the mold thus treated, and is cast-polymerized in the mold. The present invention is based on the present inventors' discovery that the glass surface treated as mentioned above provide an excellent mold inner surface, thereby providing simplified mold release, even when synthetic resin materials which strongly adhere to glass are cast polymerized. The upper limit of temperatures at which polysiloxane or silicone oil does not harden is usually 350° C.. It is preferred that the coated polysiloxane or silicone oil be heated at a temperature within the range of about 150°–300° C.

DETAILED DESCRIPTION OF PREFERRED EMBODIMENTS

In one preferred embodiment of the present invention, dimethyl polysiloxane coated on the glass surface, and thereafter the coated polysiloxane is heated in the range of from a temperature more than 150° C. to a temperature at which the polysiloxane is not yet hardened, whereby the formation of the completely cured film of polysiloxane which results in casting of a molded polymer article having unattractive surface can be avoided. In other words, firm adhesion between the baked polysiloxane and the glass surface can be obtained by heating the coated polysiloxane in the range of from a temperature of more than 150° C to a temperature at which the coated polysiloxane is not yet hardened. In addition, a smooth surface on the glass mold can be obtained by wiping the baked surface of polysiloxane with a dry cloth or a cloth dampened with a suitable solvent to removing extra polysiloxane which does not adhere to the glass surface.

Therefore, only when the heat-treatment of the coated polysiloxane is combined with wiping of the baked polysiloxane after heat-treatment can the following effects be obtained:

a. The cast article reproduces the exact pattern of the mold surface.

b. Mold release is very easy.

c. The resulting cast article has attractive appearance, and stripes, spock marks, unevenness, cloudiness and the like are not present in the surface of the resulting article.

d. The polysiloxane lubricant does not remain on the surface of the resulting article.

e. Repeated use of the same mold is possible.

f. Release of the article from the mold is easy. In other words, according to the present invention, not only is cast polymerization of resin which strongly adheres to glass been made possible, but also production efficiency is remarkably improved and finished products having a superior surface are obtained. Further, when articles cast of resin which adhere less strongly to glass are produced, production efficiency and product appearance are enhanced.

Any conventional glass can be conveniently used for the mold in the practice of the present invention. Examples of such glass include sodium silicate glass, lead silicate glass, lead-alkali glass, soda-lime glass, potash-lime glass, soda-barium glass, boro-silicate glass, phosphate glass and the like. The polysiloxane employed in the practice of the present invention may be selected from the group consisting of linear and circular dimethyl polysiloxane, branched methyl polysiloxane and mixtures thereof. The polysiloxane is generally called "silicone oil." For example, polysiloxanes of various types such as oil-type, emulsion-type, paste-type and the like, including those sold under the trade marks of such as KF 96, KS 702, KM 722, KM 740, KS 61, and the like from Shin-etsu Chemical Industries Company limited, give satisfactory results.

In the practice of the present invention, the polysiloxane selected from those mentioned above is coated on one side of each of the glass walls which is to compose the mold. Any conventional coating means such as spraying, brushing, soaking or the like can be conveniently employed.

The coated glass walls are then heated under the conditions mentioned above. As is generally known, polysiloxane hardens when it is heated in the presence of oxygen. This is believed to be due to the cross-linking introduced in the polysiloxane as a result of the reaction between radicals which have been generated by heating. One important characteristic of the process of the instant invention is that heat treatment of polysiloxane coating is carried out under such conditions that the coating will not harden. Namely, proper treating conditions including temperature, time and the like are selectively employed, taking into account the types, qualities, shapes, etc. of the glass specifically used, the types of polymerizable monomers or prepolymers specifically used, the types of polysiloxane lubricants specifically used, the convenience in handling and the like. The degree of hardening of the polysiloxane is determined by proper selection of those treating conditions.

In case the process of baking is carried out in the absence of air or oxygen or where contact of the polysiloxane coating with air or oxygen is limited, there is almost no possibility of hardening of the polysiloxane coatings. For example, the polysiloxane is coated on one surface of each of two glass plates before they are assembled with the coated surfaces facing each other in close contact followed by baking the united body under controlled conditions.

The temperature and treating time can be selected from a rather wide range so long as the decomposition of polysiloxane does not become substantial. It must be emphasized that simply coating a lubricant on the surface of glass walls is of almost no use in obtaining easier mold release; the baking treatment is essential to obtain the advantages of the invention. In addition, heat treatment must be effected at a temperature above a certain lower limit which is at least about 150°C.

In summary, baking must be carried out at a temperature within the range of from about 150°C to a certain upper limit at which polysiloxane starts hardening. The critical factor in selecting treating time and the like is that the coated polysiloxane should not start hardening.

Usually, baking treatment can be carried out for from 2 minutes to 40 hours, but preferable baking time is from 20 minutes to 4 hours.

The preferable baking temperature has been determined, on the basis of a large number of experimental results, to be in the region of about 150°C – 350°C, preferably in the region of 200°C – 300°C.

When the baked polysiloxane is herein referred to as "still not hardened" or "not yet hardened," it means that the per cent gel fraction of the baked polysiloxane determined by extracting it in toluene as an extracting solvent at 60°C for 48 hours is at most 50 percent; that is, the percentage of the cross-linked component is 50 percent or lower. Only when the coated polysiloxane has been heat treated to such a degree as mentioned above, are the advantages of the invention ensured. The theoretical basis for limiting the heat treatment for baking polysiloxane to such a degree has not been clarified yet, but it is believed that when the heat treatment is carried out at the proper temperature, the molecules of polysiloxane permeate into the micro-openings in the surface of the glass to give superior adhesion between the film of coated polysiloxane and the surface of the glass.

The surface of the glass thus coated and baked is then wiped with a cloth, gauze or the like which may be either in dry state or dampened with a certain organic solvent. This wiping treatment is also essential in the practice of the present invention.

Organic solvents which can be conveniently employed in wiping the coated and baked glass include aromatic compounds such as benzene, toluene, xylene; halogenated hydrocarbons such as carbon tetrachloride, trichloroethylene and the like; aliphatic hydrocarbons such as petroleum benzine, ligroin, petroleum ether and the like; ethers such as ethyl ether; alcohols such as ethyl alcohol, isopropyl alcohol and the like; ketones such as acetone, methyl ethyl ketone and the like, and almost all other conventional organic solvents, including two or more of mixtures of them. Among those, alcohols such as methanol, ethanol, isopropanol, etc.; ketones such as acetone; and aromatic hydrocarbons such as benzene, toluene, etc. can be employed most conveniently.

The glass walls thus baked and wiped are then assembled into various shapes of molds for the production of the cast articles of polymers through a cast polymerization process. The size and shape of the mold-wall can be varied according to the intended end use, the desired properties and the like of the cast articles such as, for example, plate-glass of a synthetic resin, lens of a synthetic resin and the like cast articles of synthetic resins.

The polymerizable monomers and/or prepolymers casting materials are charged into the mold. Useful monomers and prepolymers which can be conveniently used in the practice of the present invention include polymerizable monomers of the type containing at least one hydroxyalkyl group in their molecule such as hydroxyalkyl acrylate, hydroxyalkyl methacrylate, etc.; condensable or polymerizable monomers of the type containing at least one amino or amido group in their molecule such as melanine-formalin systems, urea-formalin systems, decyanodiamide-formalin systems, diethylaminoethyl methacrylate, acrylamide, methacrylamide, methylol acrylamide, diacetone acrylamide, N-substituted acrylamide, vinylpyrrolidone, etc.; polymerizable monomers containing at least one carboxylic group in their molecule such as acrylic acid, methacrylic acid, alpha- or beta-substituted acrylic acid, itaconic acid, maleic acid, etc.; polymerizable monomers containing at least one epoxy group in their molecule such as glycidyl acrylate, glycidyl methacrylate, etc.; polymerizable monomers containing at least one sulfone group in their molecule such as sulfonized sytrene, vinyl sulfone, etc.; and prepolymers of any of the above mentioned polymerizable or condensable monomers as well as mixtures of any two or more of them.

In the practice of the present invention, a particularly good mold release effect is obtained when the glass used for the mold-wall is selected from sodium silicate glass, potassium silicate glass, lead silicate glass and the like, and at the same time the casting material is selected from hydroxyalkyl acrylate, hydroxylalkyl methacrylate, glycidyl acrylate, glycidyl methacrylate and a mixture comprising 50 percent by weight of one or more of the above mentioned monomers and the remaining percentage of one or more of the other copolymerizable monomers is employed.

However, the process of the present invention is of course applicable when resins of the type which do not normally adhere strongly to glass are to be obtained by said cast polymerization. In fact, when such types of resins are to be produced, remarkable efficiency in production and remarkable improvement in the properties of the product are obtained. Thus, it will be understood that employable monomers or prepolymers in the practice of the present invention should not be restricted to those mentioned above. For example, the following polymerizable monomers, including prepolymers thereof and the mixtures of one or more of such monomers with one or more of such prepolymers, are employable:

styrene, vinyl toluene, alkyl acrylate, alkyl methacrylate, vinyl alkyl ether, vinyl acetate, vinyl propionate, acrylonitrile, methacrylonitrile, acrolein, methacrolein, and other acrylic and methacrylic derivatives.

In the practice of the present invention, any conventional polymerization means such as heating in the presence of a polymerization catalyst, irradiation with light or ionizing radiation and the like can be employed conveniently.

The invention is further explained by the following examples, although it will be understood that these examples are given for illustration and are not intended to limit the scope of the invention.

EXAMPLE 1

On one surface of each of two rectangular glass plates 300 mm long, 200 mm wide and 3 mm thick, silicone oil, KF 96 (trade name of a silicone oil product available from Shin-etsu Chemical Industries Company Ltd.), was coated, baked to a temperature in accordance with the present invention and the coated glass plates thus treated were wiped with dry gauze. After wiping, the two glass plates thus treated were assembled into a mold with the treated surfaces facing each other and spaced 5 mm apart, with a spacer of silicone rubber interposed between the glass plates. Into the mold thus composed, 550 g of hydroxyethyl methacrylate was charged and the monomer was subjected to Co-60 gamma-rays at room temperature at a dose rate of $1 \times 10^5$ R/hr for a total dose of $5 \times 10^5$ R for polymerization. The polymerized product was easily removed from the mold. The cast polymerized article thus obtained was observed to have an excellent surface, very smooth and free from any defect. Similar experiments were conducted using the same mold repeatedly under the same conditions as mentioned above. It was found out that the same mold can be used up to four times with almost the same degree of mold release.

Another experiment was conducted under the same conditions as mentioned above except that silicone oil was not coated on the surface of each of the glass plates. Mold release of the polymerized product was quite impossible.

The third experiment was conducted under the same conditions as those in the first one except that the baking step was cancelled. Mold release was rather difficult, and when forcible release was tried, the finished article showed a large number of cracks in the surface.

The fourth experiment was conducted by coating the silicone oil on the surface of each of the glass plates, baking it at 250°C for 1 hour and assembling a mold therefrom without wiping the surface of each of the baked glass plates, other conditions being the same as in the first experiment. Mold release was relatively easy, but the surface of the cast polymerized article was observed to have orange peel and cloudiness.

The fourth experiment was conducted using the same mold. This time, mold release after polymerization was found to be very difficult.

The fifth experiment was conducted by coating the same type of silicone oil on one surface of each of the glass plates followed by baking them at 350°C for 2 hours. This time the coated film of silicone oil hardened, and it was impossible to smooth the surface of the thus baked glass by wiping. When the glass walls of the mold were baked according to the procedures mentioned in the fith experiment and not wiped before polymerization was effected therein, under the same conditions as mentioned above, mold release after polymerization was rather easy, but the surface of the cast polymerized article was blemished by irregular stripes and pock marks. The experiment was repeated using the same mold to determine the possiblity of using the mold repeatedly. It was found out that mold release was very difficult the second and succeeding times.

EXAMPLE 2

Example 1 was repeated except that the equivalent amount of glycidyl methacrylate was used as a monomer instead of the hydroxyethyl methacrylate used in Example 1 and the dose rate employed was $1 \times 10^6$ R/hr instead of $1 \times 10^5$ R/hr in Example 1. The results were similar to those obtained in Example 1.

EXAMPLE 3

Example 1 was repeated except that the same amount of a mixture consisting of 3 parts by weight of glycidyl methacrylate and 2 parts by weight of styrene was used as a casting monomer instead of the hydroxyethylmethyl ethacrylate in Example 1, and the total dose was $2 \times 10^6$ R. The results were similar to those of Example 1. EXAMPLE 4

Example 1 was repeated except that a mixture of 1 part by weight of acrylic acid and 2 parts by weight of methyl methacrylate was used instead of the casting monomer used in Example 1 and the total dose was $1 \times 10^6$ R. The results were similar to those of Example 1.

EXAMPLE 5

On the inner surface of a mold-wall made of glass, comprising a concave surface 65 mm in diameter and having a radius of curvature of 100/6 cm, and a convex surface having a radius of curvature of 100/8 cm, silicone emulsion KM 722 was coated and baked at 250°C for 2 hours before the baked surface was wiped with an acetone-dampened gauze. Using the thus treated glass, a mold for the production of a concave lens was composed. Into this mold, 15 g of hydroxyethyl methacrylate monomer was charged and was polymerized by means of irradiation with Co-60 gamma-rays at a dose rate of $5 \times 10^4$ R/hr for a total dose of $3 \times 10^5$ R. Then, the product was separated from the mold. A concave lens of hydroxyethyl methacrylate polymer having a completely smooth surface was easily removed from the mold.

When the above experiment was repeated without coating the surface of the glass with silicone emulsion or without the baking treatment, the mold release of the polymerized product was very difficult. When the glass was coated with silicone emulsion and was baked at 250°C but the treated surface was not wiped later, the surface of the finished product showed haze and orange peel. If the baking was carried out at 350°C followed by wiping the baked surface before the baked glass plates were assembled to compose a mold, the surface of the produced lens was poor with striped patterns and/or pock marks.

EXAMPLE 6

The same mold for preparing a concave lens as used in Example 1 was used and 15 g of hydroxypropyl methacrylate monomer admixed with 0.5% by weight of benzoyl peroxide and dimethyl aniline instead of hydroxyethyl methacrylate in Example 5 was charged thereto. The mixture was polymerized at 45°C for 18 hours. The mold-walls were easily removed, and a concave lens of hydroxypropyl methacrylate polymer having a completely smooth surface was obtained. When the glass walls were not coated with silicone emulsion, or when they were coated but not baked, it was almost impossible to release the product from the mold. When the mold-walls were baked at 250°C without wiping afterward, or when baked at 350°C, the surface of the product was very poor.

EXAMPLE 7

Example 5 was repeated except that a monomer selected from hydroxyethyl acrylate, diethylaminoethyl methacrylate, hexanediol monomethacrylate, diethylaminoethyl methacrylate, hexanediol monomethacrylate, diethyleneglycol monoacrylate and diethyleneglycol monomethacrylate was used instead of the hydroxyethyl methacrylate used in Example 5. Results similar to those in Example 5 were obtained.

EXAMPLE 8

Silicone paste KS 61 was coated on one surface of each of two glass plates 100 mm long, 500 mm wide and 3 mm thick, followed by baking at 300°C for 1 hour. The baked surface was wiped with a benzene-dampened gauze. Then, a mold was assembled from said glass plates, with the treated surfaces facing each other. 0.1% by weight of azobisisobutyronitrile was added to 2500 g of glycidyl methacrylate and the mixture was heated at 60°C for about 2 hours. When the viscosity of said mixture became about 150 c.p., it was charged in the mold mentioned above. Then the mixture was polymerized by irradiation with light from two high voltage mercury-vapor lamps for photochemical use made by Toshiba Industries Limited, placed 20 cm away from each outer surface of the mold parallel to said surface, the maximum wave length of energy being 3600 A, for about 8 hours. After completion of polymerization, mold release was tried. The polymerized glycidyl methacrylate product was easily removed from the mold and had a superior surface.

When silicone paste was not coated on the surface of the mold-cavity, or when coating was not followed by baking, mold release of the polymerized product was impossible. When the baked surface was not wiped with a benzene-dampened cloth after baking at 250°C. or when baking was carried out at 350°C, the produced polymeric materials had stripe patterns and/or pock marks or haze on the surface.

Although the invention has been described in considerable detail with reference to certain preferred embodiments thereof, it will be understood that variations and modifications can be effected without departing from the spirit and scope of the invention as described hereinabove and as defined in the appended claims.

What is claimed is:

1. A process for producing a cast polymer article using a mold with a glass surface, comprising:
   coating the glass surface of the mold with polysiloxane or silicone oil;
   heating the polysiloxane or silicone oil coating on the surface at a temperature in the range of from about 150°C to about 350°C at which the percent gel fraction of the baked polysiloxane or silicone oil determined by extracting in toluene at 60°C for 48 hours is at the most 50 percent;
   wiping the coated and baked polysiloxane or silicone oil to remove excess polysiloxane or silicone oil to thus smoothen the coating;
   charging a material to be cast selected from the group consisting of a polymerizable monomer, a polymerizable prepolymer or a mixture thereof into the treated mold as above;
   polymerizing the material by a suitable polymerization means; and removing the resulting cast article from the mold.

2. A process in accordance with claim 1 wherein said polysiloxane or silicone oil is selected from the group consisting of linear and circular dimethyl polysiloxane, branched methyl polysiloxane, and mixtures thereof.

3. The process of claim 1 in which heating is carried out at a temperature in the region of about 200°C – about 300°C.

4. The process of claim 1 in which heating time is in the region of 2 minutes – 40 hours.

5. The process of claim 1 in which heating time is in the region of 20 minutes – 4 hours.

6. The process of claim 1 in which heating is carried out at a temperature in the region of about 200°C – about 300°C for 20 minutes – 4 hours.

* * * * *